United States Patent
Terai et al.

(10) Patent No.: US 11,633,924 B2
(45) Date of Patent: Apr. 25, 2023

(54) CYCLOOLEFIN POLYMER BONDING METHOD

(71) Applicant: SAMCO INC., Kyoto (JP)

(72) Inventors: Hirokazu Terai, Koka (JP); Risa Funahashi, Kyoto (JP); Tomoyasu Nishimiya, Otokuni-gun (JP)

(73) Assignee: SAMCO INC., Kyoto (JP)

( * ) Notice: Subject to any disclaimer, the term of this patent is extended or adjusted under 35 U.S.C. 154(b) by 477 days.

(21) Appl. No.: 16/489,326

(22) PCT Filed: Feb. 8, 2018

(86) PCT No.: PCT/JP2018/004470
§ 371 (c)(1),
(2) Date: Aug. 27, 2019

(87) PCT Pub. No.: WO2018/159257
PCT Pub. Date: Sep. 7, 2018

(65) Prior Publication Data
US 2019/0381744 A1    Dec. 19, 2019

(30) Foreign Application Priority Data

Feb. 28, 2017  (JP) .............................. JP2017-035963

(51) Int. Cl.
*B29C 65/00* (2006.01)
*B29K 23/00* (2006.01)

(52) U.S. Cl.
CPC ........ *B29C 66/028* (2013.01); *B29C 66/0012* (2013.01); *B29C 66/72326* (2013.01); *B29K 2023/38* (2013.01)

(58) Field of Classification Search
CPC .............. B29C 66/028; B29C 66/0012; B29C 66/72326; B29C 65/823; B29C 66/1122;
(Continued)

(56) References Cited

U.S. PATENT DOCUMENTS

| | | | | |
|---|---|---|---|---|
| 5,019,210 A | * | 5/1991 | Chou | ........................ C08J 5/12 |
| | | | | 156/272.6 |
| 2011/0256405 A1 | * | 10/2011 | Taga | ...................... B32B 37/00 |
| | | | | 428/411.1 |

FOREIGN PATENT DOCUMENTS

| CN | 102112303 A | 6/2011 |
|---|---|---|
| EP | 2 011 628 A1 | 1/2009 |

(Continued)

OTHER PUBLICATIONS

Taniguchi et al., "Photo-Activation Bonding of Cyclo-Olefin Polymer Plates: Evaluation of the Bonding Strength and Application to Micro-Fluidic Chips," Journal of the Surface Finishing Society of Japan, 2014, vol. 65, No. 5, pp. 234-239.

(Continued)

*Primary Examiner* — S. Behrooz Ghorishi
(74) *Attorney, Agent, or Firm* — Oliff PLC (57) ABSTRACT

A cycloolefin polymer (COP) bonding method wherein a first material that is COP and a second material that is COP or glass are bonded. The method includes: a step of exposing at least a bonding surface of the first material to $H_2O$ plasma; and a step of mating the bonding surface of the first material and a bonding surface of the second material. According to the method, the cycloolefin polymer (COP) can be bonded to a target material without applying high pressure or high temperature, and without affecting the optical properties.

8 Claims, 5 Drawing Sheets

(58) Field of Classification Search
CPC ... B29C 66/43; B29C 66/73772; B29C 66/71; B29C 66/73771; B29C 66/7465; B29C 66/826; B29C 65/002; B29C 66/01; B29K 2023/38; C08J 2323/00; C08J 2345/00; C08J 5/12; C08J 7/123; C09J 2400/143; C09J 2400/146; C09J 2423/006; C09J 2423/008; C09J 5/02; B32B 27/00
See application file for complete search history.

(56) References Cited

FOREIGN PATENT DOCUMENTS

| EP | 2011628 A1 * | 1/2009 | ........... B29C 66/026 |
|---|---|---|---|
| EP | 2 335 918 A1 | 6/2011 | |
| JP | 02123140 A * | 5/1990 | |
| JP | H02-123140 A | 5/1990 | |
| JP | H02-286222 A | 11/1990 | |
| JP | 2005-077239 A | 3/2005 | |
| JP | 2011-104886 A | 6/2011 | |
| JP | 2013-132822 A | 7/2013 | |
| WO | 2011/010738 A1 | 1/2011 | |

OTHER PUBLICATIONS

Apr. 24, 2018 International Search Report issued in International Patent Application No. PCT/JP2018/004470.
Apr. 24, 2018 Written Opinion of the International Searching Authority issued in International Patent Application No. PCT/JP2018/004470.
Jeyaprakash et al., "Tailormade Microfluidic Devices Through Photochemical Surface Modification," Macromolecular Chemistry and Physics, 2010, vol. 211, pp. 195-203.
Mar. 18, 2020 Extended Search Report issued in European Patent Application No. 18760433.5.

* cited by examiner

| MEASURE-MENT NO. | SURFACE ROUGHNESS Ra [nm] | | |
|---|---|---|---|
| | BEFORE PROCESS-ING | AFTER PROCESSING | |
| | | PROCESSING CONDITION 1 (100 W, 20 sec) | PROCESSING CONDITION 2 (600 W, 200 sec) |
| 1 | 8.20 | 8.98 | 30.30 |
| 2 | 7.18 | 9.59 | 24.33 |
| 3 | 4.36 | 5.86 | 21.70 |
| 4 | 7.53 | 6.35 | 33.50 |
| 5 | 7.52 | 6.90 | 20.40 |
| 6 | 7.94 | 8.22 | 40.74 |
| 7 | 7.54 | 5.57 | 12.14 |
| 8 | 3.07 | 7.69 | 20.06 |
| 9 | 9.38 | 9.03 | 20.01 |
| AVERAGE | 6.97 | 7.58 | 24.80 |

Fig. 4A

BEFORE PROCESSING

Fig. 4B

AFTER H2O PLASMA PROCESSING

Fig. 4C

AFTER O2 PLASMA PROCESSING

Fig. 5

|  | $H_2O$ PLASMA | $O_2$ PLASMA | BEFORE PROCESSING |
|---|---|---|---|
| ALIPHATIC SERIES (-C-C-) | 78.22 | 79.3 | 100 |
| HYDROXY GROUP (-OH) ETHER GROUP (-O-) | 8.04 | 13.43 | 0 |
| CARBONYL GROUP (-C=O) | 8.08 | 5.33 | 0 |
| CARBOXYL GROUP (-COOH) | 5.66 | 1.94 | 0 |

|  | GAS TYPE | FLOW RATE [sccm] | RF POWER [W] | PRESSURE [Pa] | PROCESSING TIME [sec] | EVALUATION |
|---|---|---|---|---|---|---|
| EXPERIMENTS 1, 2 | VAPOR | 20 | 100 | 5 | 20 | BONDED |
| COMPARATIVE EXPERIMENT | OXYGEN | 20 | 100 | 5 | 20 | NOT BONDED |

Fig. 8

| RF POWER [W] | BONDING STRENGTH [N/cm²] | STATE |
|---|---|---|
| 5 | 0 | × |
| 10 | 0.493 | △ |
| 50 | 1.217 | ◎ |
| 100 | 1.387 | ◎ |
| 200 | 1.232 | ◎ |
| 400 | 0.158 | △ |
| 600 | 0 | × |
| 600W (200sec) | 0 | × |

EXPLANATORY NOTE (STATE)
×: NOT BONDED
△: SEPARATED AT INTERFACE
◎: MATERIAL BROKEN

Fig. 9

| RF POWER [W] | BONDING STRENGTH [N/cm²] | STATE |
|---|---|---|
| 10 | 0.162 | △ |
| 100 | 0.926 | △ |
| 400 | 0 | × |
| 600 | 0 | × |

EXPLANATORY NOTE (STATE)
×: NOT BONDED
△: SEPARATED AT INTERFACE
◎: MATERIAL BROKEN

CYCLOOLEFIN POLYMER BONDING METHOD

TECHNICAL FIELD

The present invention relates to a method of bonding a cycloolefin polymer to a target material.

BACKGROUND ART

Cycloolefin polymers (COP) are a saturated hydrocarbon-based amorphous plastic, and have excellent optical properties, such as the small birefringence led by their transparency in a visible light region. In addition, the degree of expansion of COP due to water is low, so that COP is often used in optical lenses. Furthermore, the background fluorescence intensity of COP is also low, which is comparable to that of glass. Thus, the use of COP in a microchannel device (microchannel chip) in the fluorescence detection system has been considered. In addition, the loss tangent that indicates the degree of loss in the electric energy in a material is low, and thus COP is excellent in the high frequency properties. Such properties are focused on, and the application of COP as an electronic material is expected.

However, COP is a hydrophobic resin, and thus has low wettability and low adhesiveness. Accordingly, the manufacturing, with COP, of optical devices including the microchannel chip is associated with difficulty. In view of this situation, it has been reported that the surfaces of members made of COP are modified by being irradiated with the excimer UV light, and are bonded with each other without using an adhesive (Non-Patent Literature 1). Furthermore, it has been also proposed that the surface of a member made of the COP is modified by being subjected to oxygen plasma processing, and is bonded to silicon (or glass) without using an adhesive (Patent Literature 1).

CITATION LIST

Patent Literature

Patent Literature 1: JP 2011-104886 A

Non Patent Literature

Non Patent Literature 1: "Photo-Activation Bonding of Cyclo-Olefin Polymer Plates: Evaluation of the Bonding Strength and Application to Micro-Fluidic Chips", Yoshinao TANIGUCHI, and others, Journal of the Surface Finishing Society of Japan, vol. 65 (2014), No. 5, p. 234-239

SUMMARY OF INVENTION

Technical Problem

As previously mentioned, the surfaces of members made of COP have been modified by the application of the excimer UV light or the oxygen plasma processing. However, in such a method of modifying the surfaces of members made of COP, the sufficient bonding strength could not have been obtained by merely mating the modified surfaces, so that application of the pressure or heat has been necessary. In the method of modifying the surface of a member made of COP by applying the excimer UV light to the surface, for example, it is necessary to apply pressure of 3.6 MPa or more and heat of 70° C. or more for obtaining the bonding strength of 3 N/cm$^2$ or more (Non-Patent Literature 1). Here, in the case where a microchannel chip is manufactured, such application of the pressure or heat causes the pattern of a channel to be deformed, or causes the surface that has the hydrophilic property to be changed to have the hydrophobic property. Furthermore, for obtaining the sufficient bonding strength by this method, it is preferable that a time period during which the excimer UV light is applied is set at 3 minutes or more (Non-Patent Literature 1). However, the elongated time period of application of the excimer UV light causes increased fluorescence intensity of COP. Accordingly, the application of the excimer UV light for 3 minutes or more is not preferable in the manufacturing of the microchannel chip in the fluorescence detection system.

The present invention has been made for solving the problems mentioned earlier. The purpose of the present invention is to provide a method of bonding COP to a target material without applying high pressure or increasing temperature, and without affecting the optical properties.

Solution To Problem

The present invention developed for solving the previously described problem is a cycloolefin polymer bonding method of bonding a first material that is a cycloolefin polymer and a second material, the method includes:

a step of exposing at least a bonding surface of the first material to H$_2$O plasma; and a step of mating the bonding surface of the first material and a bonding surface of the second material In the above method, a target material (the second material) to be bonded to COP may be COP or any other material except for COP. As the specific second material, COP, glass, and so on, are supposed, for example.

In the above method, the bonding surface of each of the materials preferably has the surface roughness Ra of 10 nm or less.

It is preferable that the power of the H$_2$O plasma (i.e., the power of the high-frequency electrical power, which causes the H$_2$O plasma to be generated) to which at least the bonding surface of the first material is exposed is 10 to 400 W. The H$_2$O plasma with such power does not affect the optical properties of COP, when COP is exposed to the H$_2$O plasma.

The pressure of the plasma at that time is preferably the level of 1 to 200 Pa.

A time period during which the bonding surface is exposed to the plasma is preferably 2 to 600 seconds.

The "H$_2$O plasma" in the present disclosure indicates the plasma with the H$_2$O partial-pressure of 20% or more. Plasma gas may contain, in addition to H$_2$O, a small amount of other gases, such as oxygen (O$_2$), nitrogen (N$_2$), ammonia (NH$_3$), hydrogen (H$_2$), argon (Ar), and helium (He).

After exposing at least the bonding surface of the first material to H$_2$O plasma, the bonding surfaces of the first material and the second material are mated, and thereby both materials are bonded. At that time, it is substantially unnecessary to apply pressure to the bonding surfaces. If the material has the weight of 0.2 g or so, an adequately strong bonding is obtained by the material's own weight.

If COP and COP are bonded (i.e., in the case where the second material is COP) by the bonding method of the present invention, in addition to making a mechanically strong bonding, the materials of both surfaces are optically unified. In this case, the bonding surface does not optically appear. In other words, no optical refraction or reflection occurs on the bonding surface, and a light beam passes straight across the bonding surface.

One of the application examples of the bonding method according to the present invention may be the microchannel chip. In such a case, the aforementioned bonding method is used to bond the top surface of a lower substrate made of COP and the bottom surface of a middle substrate made of COP in which a channel is formed, as well as to bond the top surface of the middle substrate and the bottom surface of an upper substrate made of COP, thereby manufacturing the microchannel chip made of COP, in which the substrates are firmly unified.

In this microchannel chip, no light refraction or reflection occurs on the bonding surface, i.e., portions except for the channel. Accordingly, the accuracy in measurement of a liquid to be measured in the channel is enhanced.

Advantageous Effects of Invention

In a method of bonding a COP according to the present invention, COP can be bonded to the target material adequately firmly even without substantially applying pressure to the bonding surface and without increasing the temperature, and the optical properties of COP may not be affected. In particular, if COP and COP are bonded by the bonding method according to the present invention, not only the bonding is mechanically strong, but also the materials of both surfaces are optically unified. Thus, the bonding method is appropriate for bonding two or more parts to provide an optical device. Furthermore, if COP is used as the material of an electronic component taking account of the high-frequency properties of COP, an electronic component with low loss is obtained since the reflection or refraction of the high frequencies does not occur on the surface at which the parts are bonded.

DESCRIPTION OF EMBODIMENTS

Hereinafter, a preferable embodiment of the present invention is described as follows, with reference to the drawings.

<1. Configuration of Apparatus>

Figure 1:
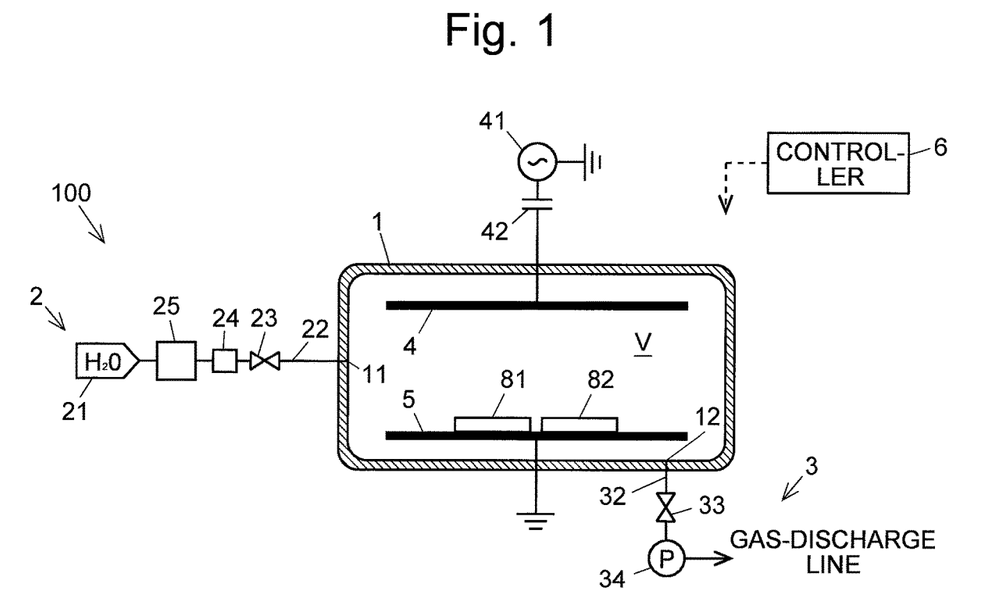
FIG. 1 is a schematic configuration diagram of a plasma processing apparatus.

A plasma processing apparatus used in the bonding method according to the embodiment is described with reference to FIG. 1, which is a schematic configuration diagram of a plasma processing apparatus 100. As apparent from FIG. 1, the plasma processing apparatus 100 is the parallel-plate-electrode type (capacitively coupled type).

The plasma processing apparatus 100 mainly includes: a plasma processing chamber 1 having, in its interior, a processing space V in which target objects 81 and 82 to be processed are disposed; a water-introduction section 2 for introducing water (actually, the gaseous water, i.e., water vapor) into the processing space V; a gas-discharge section 3 for discharging gas in the processing space V; a pair of electrodes 4 and 5 disposed opposite to each other in the processing space V; and a controller 6 for controlling these sections.

The plasma processing chamber 1 includes a gas-introduction port 11 for introducing gas into the processing space V, and a gas-discharge port 12 for discharging gas in the processing space V. The gas-introduction port 11 is connected to a pipe 22 to be described later. The gas-discharge port 12 is connected to a pipe 32 to be described later.

The water-introduction section 2 includes the pipe 22 that has one end connected to the gas-introduction port 11, and the other end connected to a water supply source 21. The pipe 22 is provided with, at its any portion: a valve 23; a mass flow controller 24 for automatically controlling the flow rate of the gas flowing through the pipe 22; a vaporizer 25 for vaporizing the fluid to be introduced (in this apparatus, water is vaporized to water vapor). Each of the units 23, 24, and 25 is electrically connected to the controller 6, and the introduction of the water vapor into the processing space V as well as the suspension of such introduction of the water vapor are controlled by the controller 6.

The gas-discharge section 3 includes the pipe 32 that has one end connected to the gas-discharge port 12, and the other end connected to a gas-discharge line. The pipe 32 is provided with, at its any portion, a valve 33 and a vacuum pump 34, each of which is electrically connected to the controller 6, so that the discharge of the gas from the processing space V is controlled by the controller 6.

The electrode 4 of the pair of electrodes 4 and 5 disposed opposite to each other in the plasma processing chamber 1 is supplied with electric power from a radio frequency (RF) power source 41 via a capacitor 42 (hereinafter the electrode 4 is referred to as "the powered electrode 4"). The electrode 5 that is the other electrode of the pair of electrodes is grounded (hereinafter, the electrode 5 is referred to as "the ground electrode 5"). In this configuration, the RF electric power is supplied to the powered electrode 4, thereby generating plasma from the gas introduced in the processing space V. In the plasma processing performed in the plasma processing apparatus 100, the mode relating to the electrode on which the target objects 81 and 82 are placed can be selected from two modes including the Reactive Ion Etching (RIE) mode in which the target objects 81 and 82 are placed on the powered electrode 4, and the Plasma Etching (PE) mode in which the target objects 81 and 82 are placed on the ground electrode 5. When the present invention is reduced into practice, either mode can be used. In the example shown in the drawings, for example, the plasma processing is carried out in the PE mode.

The controller 6 controls each of the units to perform a series of the processing. For the controller 6, a personal computer is used as the hardware resource. The dedicated controlling/processing software installed in the personal computer is executed to embody the various functional blocks necessary for the control.

<2. Flow of Processing>

Figure 2:
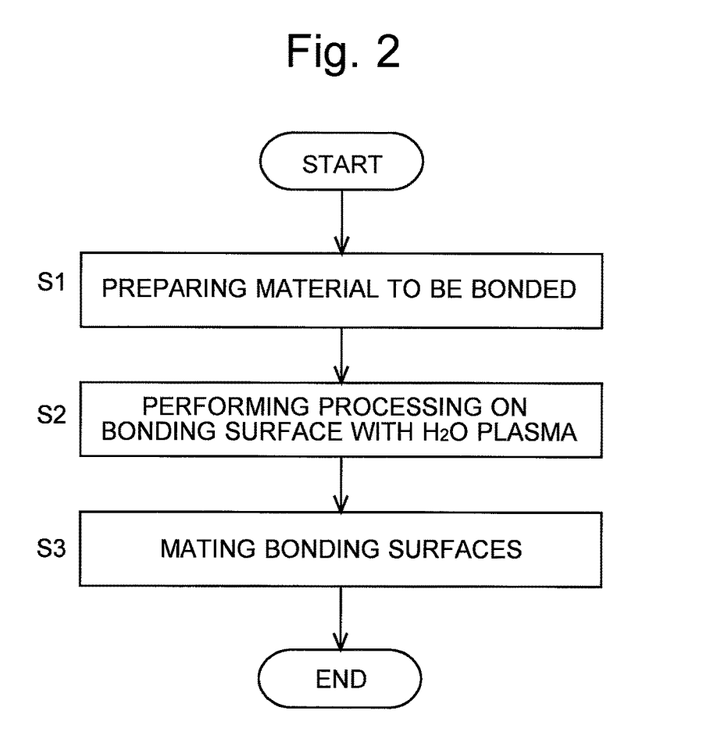
FIG. 2 is a flow chart of a bonding method.

A bonding method according to the embodiment is described with reference to FIG. 2 that is the flow chart of the bonding method.

Step S1: First, two materials to be bonded (a first material 81 and a second material 82) are prepared. Here, the first material 81 and the second material 82 both are a thin plate made of cycloolefin polymers (COP), and respectively form a lower substrate and a middle substrate (corresponding to the substrate in which a passage pattern is formed) of the microchannel chip, for example. In this case, surfaces respectively corresponding to the top surface of the lower substrate and the bottom surface of the middle substrate are the bonding surfaces of the materials 81 and 82. Here, the surface roughness Ra of the bonding surface of each of the materials 81 and 82 is set to 10 nm or less.

Step S2: Then, the bonding surfaces of the first material 81 and the second material 82 are subjected to the $H_2O$ plasma processing.

The processing in Step S2 is carried out using, for example, the aforementioned plasma processing apparatus 100. In such a case, the first material 81 and the second material 82 are first put into the plasma processing chamber 1 via a carry-in port (not shown). Then, the first and second materials 81 and 82 are placed on the ground electrode 5 (alternatively, the materials may be placed on the powered electrode 4) so that the bonding surfaces of the first and second materials face upward, and then fixed by an electrostatic chuck or the like.

Subsequently, the $H_2O$ plasma is created in the processing space V. Specifically, the carry-in port is closed to seal the plasma processing chamber 1, and then the water vapor is introduced into the processing space V. At the same time, the gas in the processing space V is discharged to maintain the processing space V at the predetermined pressure in the range of 1 to 200 Pa. Then, the high-frequency power of 10 to 400 W is applied to the powered electrode 4. Here, it is assumed that the area of the powered electrode 4 is 2975 $cm^2$. With this processing, the water vapor introduced into the processing space V is changed into plasma, thereby creating $H_2O$ plasma. Accordingly, the plasma processing is promoted on the bonding surfaces of the first and second materials 81 and 82 which are exposed to the $H_2O$ plasma.

After the lapse of the predetermined time period from the start of the processing with the $H_2O$ plasma, the valve 23 is closed to stop the supply of the water vapor as well as the supply of the high-frequency power, to terminate the processing. Here, the predetermined time period (i.e., the time period in which the bonding surfaces of the materials 81 and 82 are exposed to the $H_2O$ plasma) is set to the predetermined time period in the range of 2 to 600 seconds.

Subsequently, the processing space V is turned to be at atmospheric pressure, and the respective materials 81 and 82 are taken out of the plasma processing chamber 1. However, the next Step S3 may be sequentially performed in the plasma processing chamber 1 without taking the respective materials 81 and 82 out of the plasma processing chamber 1 at this timing.

Step S3: Then, the bonding surfaces of the first material 81 and the second material 82 are mated. The bonding surfaces are bonded only by their own weights at a normal temperature with no heat or pressure applied. It is preferable that Step S3 is completed within 30 minutes from the termination of the processing with the $H_2O$ plasma. Here, if the first material 81 and the second material 82 which have undergone the processing are stored under the reduced-pressure atmosphere or the nitrogen atmosphere, the bonding surfaces can be bonded in the same way, even after two hours or more pass from the termination of the processing.

The first material 81 and the second material 82 are bonded through the aforementioned processing. In other words, the lower substrate and the middle substrate in the microchannel chip are bonded. The middle substrate (the middle substrate to which the lower substrate is bonded) and the upper substrate are prepared (Step S1), and the top surface of the middle substrate and the bottom surface of the upper substrate are used as the bonding surfaces for performing each processing in Step S2 and Step S3, thereby obtaining the microchannel chip in which three substrates are laminated.

It is supposed by the inventors of the present invention that the processing of the bonding surface of a material made of COP with $H_2O$ plasma may cause the following three reactions:

First, when the bonding surface is exposed to the $H_2O$ plasma, a part of the polymers existing on the bonding surface is oxidized and separated (i.e., the surface of the material is etched). Furthermore, the main chain of high polymers existing on the bonding surface is cut, so that the high polymers turn to low polymers. In addition, burrs on the end of the bonding surfaces are removed. With the processing, the bonding surface is smoothed (i.e., the surface roughness decreases), so as to allow the bonding surface to be easily bonded. However, if such reactions excessively proceed, the surface roughness may conversely increase. Even in such a case, the surface roughness can be controlled so as not to be excessively large by controlling the power of the $H_2O$ plasma (i.e., the electric power applied to the powered electrode 4) to be low (specifically, the power is set at 400 W or lower), or shortening the time period of the processing (specifically, the time period is set at 600 seconds or shorter).

In order to check the aforementioned point, the inventors of the present invention conducted experiments to measure how the surface roughness Ra of each of the samples changes before and after the $H_2O$ plasma processing. In the experiments, materials made of COP were used as samples, and the $H_2O$ plasma processing was performed on the samples under the processing conditions 1 and 2 which are different from each other in the electric power to be applied to the powered electrode 4 and in the time periods for the processing. Here, in the processing condition 1, the electric power to be applied to the powered electrode 4 was 100 W and the processing time period was 20 seconds, whereas in the processing condition 2, the electric power to be applied to the powered electrode 4 was 600 W and the processing time period was 200 seconds. Furthermore, the surface roughness Ra was measured by the Dektak 3ST Profilometer produced by Bruker Corporation (scan length: 500 μm, force: 20 mg).

Figure 3:
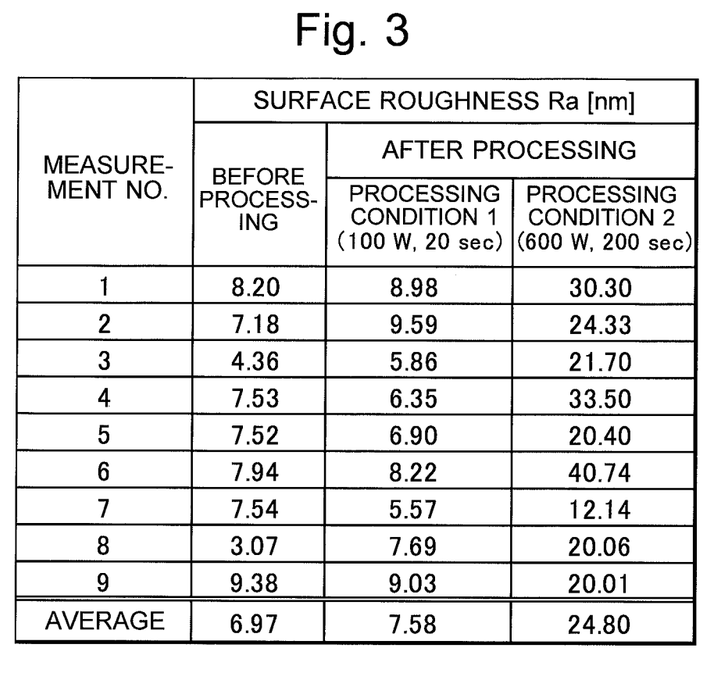
FIG. 3 is a table showing the results obtained by measuring the surface roughness of a COP material before and after the application of $H_2O$ plasma processing.

FIG. 3 shows the results of the experiments. As shown in FIG. 3, in the processing condition 1 in which the power is the relatively low level of 100 W, and the processing time period is the relatively short period of 20 seconds, the surface roughness does not remarkably change in comparison with the state before the processing (i.e., the surface is not roughened). In contrast, in the processing condition 2 in which the power is the relatively high level of 600 W and the processing time period is the relatively long period of 200 seconds, the surface roughness is larger than those before the processing (i.e., the surface is roughened).

Second, COP is a saturated hydrocarbon-based polymer having the annular structure (alicyclic structure). Thus, if the annular structure is broken, the bonding surface becomes rough, making it difficult to achieve bonding. In addition, if the annular structure is broken, the optical properties may be affected, e.g., the transparency may decrease. However, if the power of the $H_2O$ plasma is decreased (specifically, to 400 W or lower), the annular ring would not be broken, and would thereby be maintained.

Third, it is supposed that hydroxyl radical, atomic hydrogen, and atomic oxygen, which are contained in the $H_2O$ plasma, modify the functional groups (OH group, COOH group, C=O group, and others) of polymers existing on the bonding surfaces, thereby causing the bonding surfaces to be hydrophilic.

In order to check this point, the inventors of the present invention conducted experiments for observing surface conditions of the COP materials that underwent the $H_2O$ plasma processing. Specifically, the COP was prepared as a sample, and the $H_2O$ plasma processing was applied to the surface of the sample using a plasma processing apparatus (product name: AQ-2000) manufactured by Samco Inc. The conditions of the plasma processing were set such that: the flow rate of $H_2O$ gas was 20 sccm; the high-frequency electric power was 100 W (the area of the powered electrode: 2975 $cm^2$); and the processing time period was 20 seconds. Then, the surfaces of the respective samples before and after the $H_2O$ plasma processing were analyzed using a scan-type X-ray photoelectron spectrometry (product name: PHI 5000 VersaProbe II) manufactured by ULVAC-PHI, Inc. The obtained results are respectively shown in FIG. 4A and FIG. 4B.

As comparative experiments, the gas creating the plasma was changed from water vapor to oxygen, and the same sample as the aforementioned sample was subjected to the processing with oxygen plasma, without using the $H_2O$ plasma. Other conditions for the experiments, except for the type of gas, are common to the experiments mentioned earlier. The surface of the sample after the $O_2$ plasma processing was analyzed by the same method as the aforementioned method. The obtained results are shown in FIG. 4C.

Figure 4A:
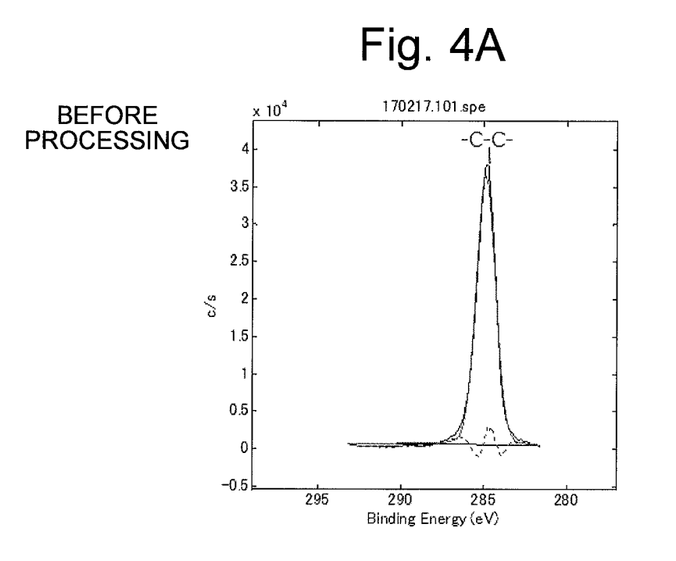
FIG. 4A is a graph showing the results obtained by analyzing the surface of COP material before the application of the processing.
Figure 4B:
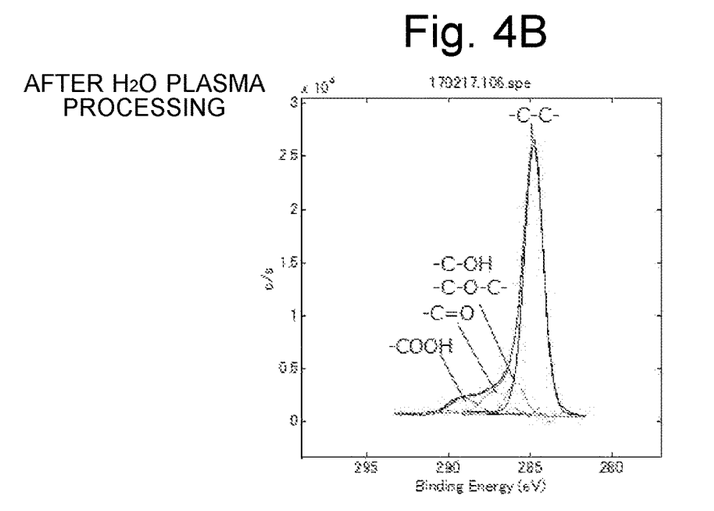
FIG. 4B is a graph showing the results obtained by analyzing the surface of COP material after the application of the $H_2O$ plasma processing.
Figure 4C:
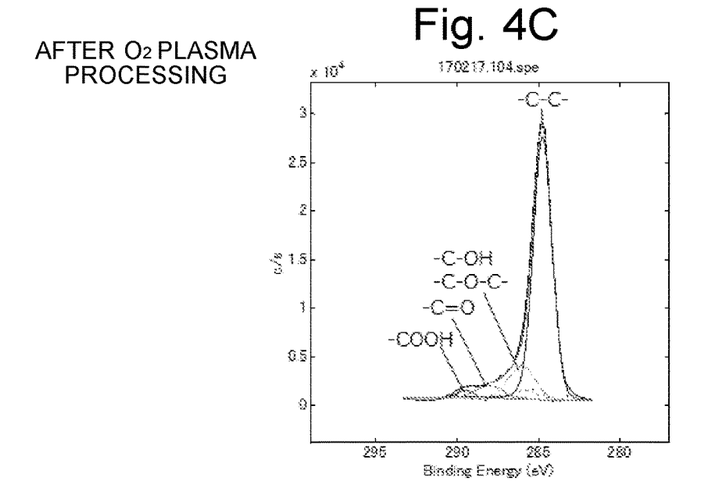
FIG. 4C is a graph showing the results obtained by analyzing the surface of COP material after the application of $O_2$ plasma processing.
Figure 5:
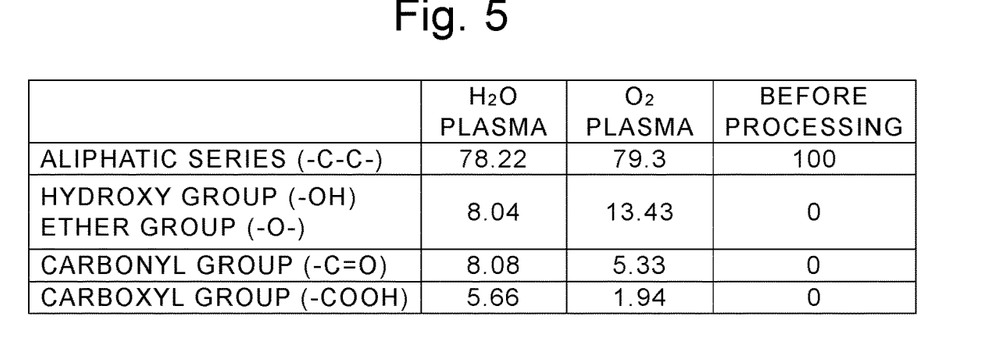
FIG. 5 is a table showing the results obtained by analyzing the surface of COP material after the application of each of the $H_2O$ plasma processing and the $O_2$ plasma processing.

In addition, the table in FIG. 5 shows the ratios (%) of the peak heights of the respective functional groups, which are obtained from the respective analysis results shown in FIGS. 4A to 4C.

As shown in FIG. 5, only the carbon-carbon bonding (—C—C—) in the alicyclic structure is detected from the surface of a sample (COP) that is not yet subjected to the plasma processing, whereas functional groups, such as a carboxy group and a carbonyl group are detected from the surface of the COP, which already underwent the plasma processing. It is supposed that these functional groups cause the bonding surface of the COP to be hydrophilic. Meanwhile, functional groups the same as these groups are detected from the surface of the COP, which underwent the $O_2$ plasma processing. The respective ratios of the carboxyl groups and carbonyl groups are lower than those obtained in the surface of the COP, which underwent the $H_2O$ plasma processing. Accordingly, it is supposed that the hydrophilic degree in the surface treated with the $O_2$ plasma processing is low.

With the three aforementioned reactions, the bonding surfaces are modified to be easily bonded, without affecting the optical properties of the COP. Accordingly, it is supposed that the bonding can be achieved only by mating the bonding surfaces, without application of heat or pressure.

<3. Modified Example>

In the aforementioned experiments, the first material 81 and the second material 82 are both subjected to the $H_2O$ plasma processing. Here, only one of the first and second materials 81 and 82 may be subjected to the $H_2O$ plasma processing. In such a case, the processing conditions of the plasma processing can be the same as those in the aforementioned experiments.

In the experiments mentioned earlier, the first material 81 and the second material 82 are both made of COP. Here, one of the first and second materials 81 and 82 may be made of a material other than COP. Specifically, the second material 82 may be an organic substance, such as a copolymer containing a component selected from an aromatic component, a vinyl group, and a cyclobutene group, and may be the organic substance including polyamide, polyester, polyurethane, polysiloxane, phenolic resin, polysulphide, polyacetal, polyacrylonitrile, polyvinyl chloride, polystyrene, polymethyl methacrylate, polyvinyl acetate, polytetrafluoroethylene, polyisoprene, polycarbonate, polyether, polyimide, polybenzimidazole, polybenzoxazole, polybenzothiazole, polyoxadiazole, polytriazole, polyquinoxaline, polyimidazopyrrolone, and epoxy resin. Alternatively, the second material 82 may be an inorganic substance, such as glass, sapphire, zinc oxide, and indium tin oxide (ITO).

When the second material 82 is made of a material other than COP, both of the first material made of COP and the second material made of the material other than COP may be subjected to the $H_2O$ plasma processing. Alternatively, only the first material made of COP may be subjected to the $H_2O$ plasma processing. The processing conditions of the plasma processing applied to the first material made of COP are preferably the same as those in the aforementioned experiments. The processing conditions of the plasma processing applied to the second material made of the material other than COP may be the same as those for the plasma processing applied to the first material, or may be different from those for the first material. For example, if the second material is made of glass, the second material may be subjected to the processing using the $H_2O$ plasma with the power of 400 W or more.

In the aforementioned case, water vapor is introduced in the processing space V, when the respective first and second materials 81 and 82 are subjected to the $H_2O$ plasma processing. Here, water in the liquid state (droplets), water in the solid state (ice-fog), or a mixture of these types of water may be introduced in the processing space V. At this time, gas (for example, oxygen, nitrogen, air, argon, helium, ammonia, hydrogen, and so on) other than the water vapor may be additionally introduced into the processing space V. Here, in such a case, the flow rate of each of the gases to be introduced is preferably controlled so that the partial pressure of $H_2O$ in the mixed gas in the processing space V becomes 20% or more.

In the aforementioned experiments, Step S3 includes no heating or pressure application. However, the heating and pressure application are not ruled out at all. The heating and pressure application may be conducted at a level without deforming the passage pattern formed in the second material 82, or without changing the hydrophilic surface to be hydrophobic.

In the aforementioned experiments, the bonding surface of each of the first and second materials may be irradiated with ultraviolet light before the processing in Step S2 (in which the bonding surfaces of the first material 81 and the second material 82 are exposed to the $H_2O$ plasma). Alternatively, the bonding surfaces may be irradiated with the ultraviolet light during the processing in Step S2 (i.e., along with the processing in Step S2). The irradiation with the ultraviolet light increases the bonding strength between the first material 81 and the second material 82.

In the earlier description, the bonding of substrates constituting a microchannel chip is exemplified. The aforementioned method can also be used for bonding members both made of COP, and bonding a member made of COP with a glass plate, in the steps of manufacturing various members (for example, an organic electroluminescence (EL) structure, an optical film, a polarizing plate, a liquid crystal display support member, a polarizer, a touch panel support member, and so on) having members made of COP (a film made of COP, a plate made of COP, and so on) as the structural elements.

<4. Evaluation Experiment>

<4-1. Comparative Experiment Using Oxygen Gas>

Figure 6A:
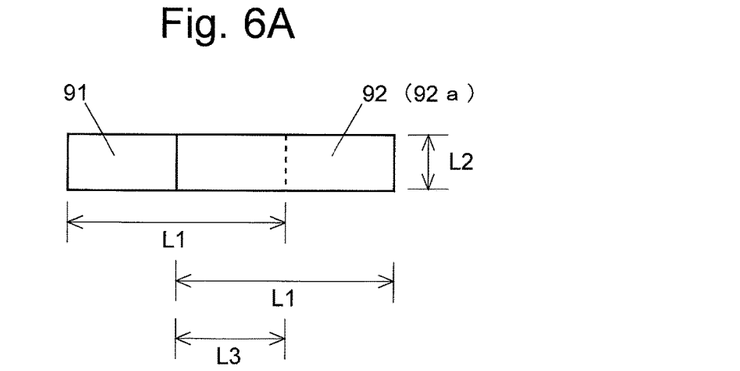
FIG. 6A is an explanatory diagram of a sample used in an evaluation experiment.
Figure 7:
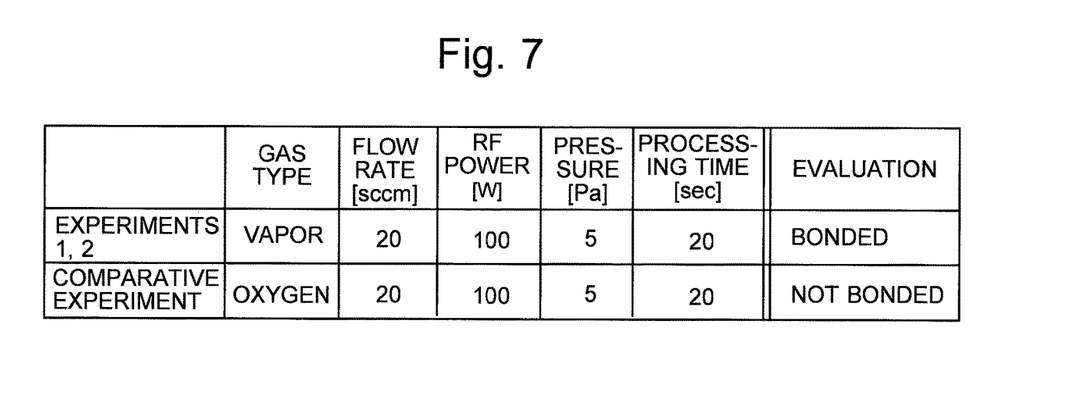
FIG. 7 is a table showing the generation conditions of $H_2O$ plasma and the bonding evaluation, in experiments 1 and 2.

Experiment 1: Thin plates made of COP (length: 30 mm (L1), width: 8 mm (L2), thickness: 1 mm, surface roughness Ra: 6.6 nm, and mass: 0.24 g) were prepared as a first sample 91 and a second sample 92 (FIG. 6A). Both samples 91 and 92 were subjected to the processing with the $H_2O$ plasma. A part of the main surface (a part having the length of 12.5 mm (L3), and the width of 8 mm (L2)) exposed to the plasma in one of the samples was mated to a part of the main surface of the other sample. Then, it was observed whether the samples 91 and 92 were bonded without heating or the application of pressure (with only their own weights). At this time, the generation conditions of the $H_2O$ plasma were set as shown in FIG. 7. The evaluation of the bonding strength was performed based on JIS K 6856 (Testing methods for flexural strength of adhesive bonds).

Comparative experiment: The gas creating the plasma in experiment 1 was changed from the water vapor to oxygen, and the samples 91 and 92 were subjected to the processing with oxygen plasma, not with $H_2O$ plasma. The experiment conditions other than the type of gas were common to those in experiment 1.

In experiment 1, the first sample 91 and the second sample 92 were bonded. However, these were not bonded in the comparative experiment. In other words, the bonding surfaces were bonded at their COP by the processing with the $H_2O$ plasma, but the bonding surfaces were not bonded at their COP by the processing with the oxygen plasma. The reason why the bonding was not achieved by the processing with the oxygen plasma is as follows: with the oxygen plasma, the functional groups of the polymers were not adequately changed to be hydrophilic due to the low power, such as 100 W (i.e., the processing condition such that the surface roughness is not increased by etching or the like, and the annular structure is not broken, either).

<4-2. Bonding of COP and glass plate>

Experiment 2: For the first sample 91, the thin plate made of COP used in experiment 1 was used as it was. Only a second sample 92a was prepared with changing the thin plate made of COP to a thin plate made of glass (length: 30 mm (L1), width: 8 mm (L2), thickness: 1 mm, surface roughness Ra: 6.6 nm, and mass: 0.6 g). The experiment conditions other than the material of the second sample 92a were common to those in experiment 1.

Comparative experiment: The gas creating the plasma in experiment 2 was changed from water vapor to oxygen, and the first and second samples 91 and 92a were subjected to processing with oxygen plasma, not with $H_2O$ plasma. The experiment conditions other than the type of the gas were common to those in experiment 2.

In experiment 2, the first sample 91 and the second sample 92a were bonded. However, these were not bonded in the comparative experiment. In other words, COP and the glass were bonded by the processing with the $H_2O$ plasma, but were not bonded by the processing with oxygen plasma.

<4-3. Power of Plasma>

Figure 6B:
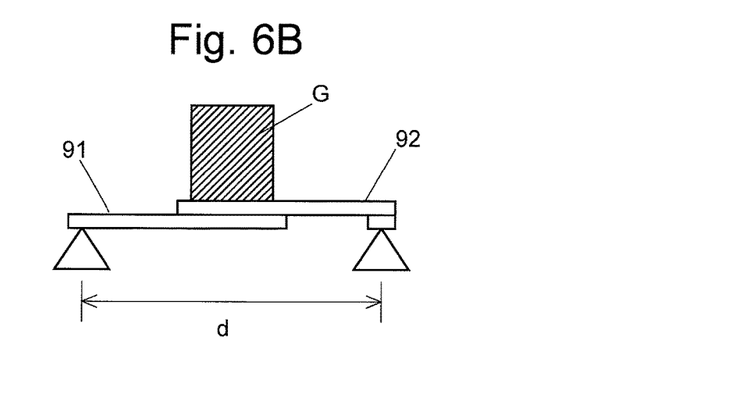
FIG. 6B is an explanatory diagram of a method of measuring the bonding strength.
Figure 8:
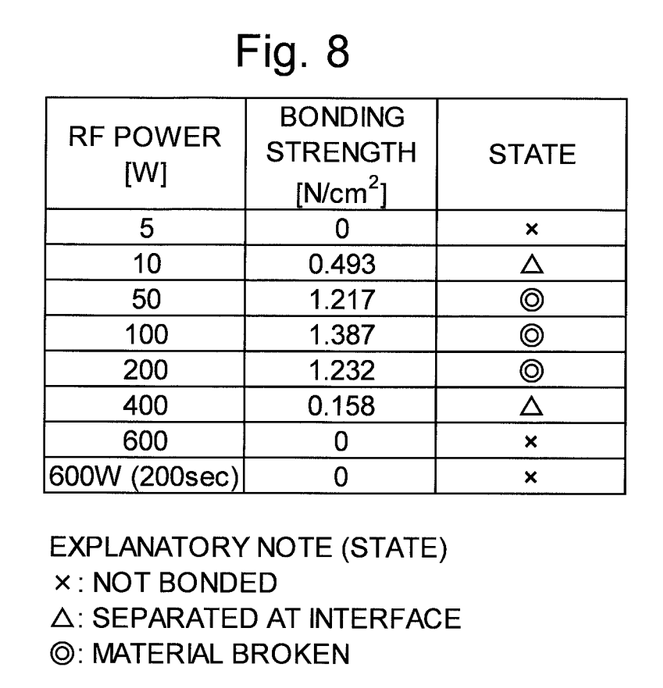
FIG. 8 is a table showing the bonding strength of a first sample and a second sample, which are treated with the $H_2O$ plasma in experiment 3.

Experiment 3: The first and second samples 91 and 92, which were the same as those used in experiment 1, were subjected to the processing with $H_2O$ plasma under the respective plasma conditions in which the electrical power (RF power) to be applied to the powered electrode 4 was selected from 5 W, 10 W, 50 W, 100 W, 200 W, 400 W, and 600 W, and the bonding strength between the first and second samples 91 and 92 was measured. The conditions of creating the $H_2O$ plasma other than the RF power were common over the cases associated with the respective plasma conditions, and were also the same as those in experiment 1 (FIG. 7). Regarding the case in which the RF power is 600 W, the additional evaluation was also conducted under another condition of the processing time period that was changed to 200 seconds. The bonding strength was measured by a press-bending test, as shown in FIG. 6B. The first sample 91 and the second sample 92 which were bonded were placed on a pair of support tools disposed with the predetermined space d (d=38 mm) in the width direction of the bonded samples, and a load G was applied to the bonding surface (three point bend test). The load G was gradually increased, and the maximum load (breaking load) G was measured. The maximum load is the load at the moment when the bonding surfaces were separated (fractured) or when the samples were broken. FIG. 8 shows a table indicating the bonding strength between the first sample 91 and the second sample 92, which were treated with the $H_2O$ plasma in experiment 3. In the table shown in FIG. 8, the value "0" of the bonding strength means that no bonding was achieved. The "state" in this table indicate the state of the first and second samples 91 and 92 when the bonding strength was measured with the aforementioned method: where "⊚" indicates that the sample itself was broken at the measurement; "Δ" indicates that the separation occurred between the samples at the measurement; and "x" indicates that the samples were not bonded in the first place.

As seen from the table shown in FIG. 8, the first sample 91 and the second sample 92 were bonded through the $H_2O$ plasma processing with the RF power in the range of 10 to 400 W. However, the samples were not bonded through the $H_2O$ plasma processing with the RF power out of this range. If the power of the $H_2O$ plasma is lower than 10 W, the modification of the surface of COP does not sufficiently occur. Accordingly, the bonding was not achieved. Meanwhile, if the power of the $H_2O$ plasma exceeds 400 W, such reaction proceeds that the surface roughness is increased by the etching or the like, or the annular structure of COP is broken. Accordingly, the bonding was not achieved either. On the other hand, if the RF power is in the range of 10 to 400 W, the bonding was achieved. In particular, if the RF power is in the range of 50 to 200 W, the especially high bonding strength of 1.2 ($N/cm^2$) or more could be obtained. In addition, the sample itself was broken, at the time of measuring the bonding strength, before separation between the samples occurs. Accordingly, the bonding strength higher than the braking strength of COP was obtained.

Figure 9:
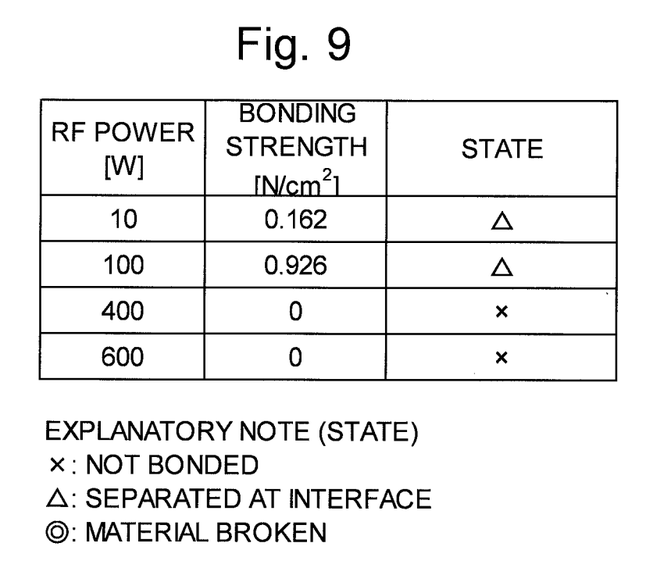
FIG. 9 is a table showing the bonding strength of the first sample and the second sample, which are treated with the $O_2$ plasma in experiment 3.

Comparative experiment: The gas creating the plasma was changed from water vapor to oxygen, and the first and second samples 91 and 92 which were the same as those used in experiment 3 were subjected to the processing with the $O_2$ plasma under the respective plasma conditions in which the RF power was selected from 10 W, 100 W, 400 W, and 600 W. The bonding strength between the first and second samples 91 and 92 was measured with the method same as that used in experiment 3. FIG. 9 shows a table indicating the bonding strength between the first sample 91 and the second sample 92, which were subjected to the processing with the $O_2$ plasma in the aforementioned comparative experiment.

As seen from the table shown in FIG. 9, when the processing is performed using the $O_2$ plasma, the range of the RF power by which the first sample 91 and the second sample 92 are bonded is in the range of 10 to 100 W, which is narrower than the range in the case where the processing was performed with the $H_2O$ plasma. The bonding strength is mostly 0.9 N/cm$^2$ or less, which is lower than that in the case of the processing with the $H_2O$ plasma. In addition, in every case where the bonding was achieved, the samples were separated at the measurement of the bonding strength. Accordingly, the bonding strength lower than the braking strength of COP was only obtained.

REFERENCE SIGNS LIST

100 . . . Plasma Processing Apparatus
1 . . . Plasma Processing Chamber
11 . . . Gas-Introduction Port
12 . . . Gas-Discharge Port
2 . . . Water-Introduction Section
21 . . . Water Supply Source
22 . . . Pipe
23 . . . Valve
24 . . . Mass Flow Controller 3 . . . Gas-Discharge Section 32 . . . Pipe 33 . . . Valve 34 . . . Vacuum Pump 4 . . . Powered Electrode 41 . . . RF Power Source 42 . . . Capacitor 5 . . . Grounded Electrode 6 . . . Controller 81 . . . First Material 82 . . . Second Material 91 . . . First Sample 92 . . . Second Sample

The invention claimed is:

1. A cycloolefin polymer bonding method of bonding a first material that is a cycloolefin polymer and a second material, the method comprising:
   an $H_2O$-plasma exposure step of exposing at least a bonding surface of the first material to $H_2O$-plasma;
   an overlapping step of overlapping the bonding surface of the first material and a bonding surface of the second material in a vertical direction; and
   bonding the overlapped bonding surface of the first material and the overlapped bonding surface of the second material by own weight of the first material or the second material with no heat or pressure applied.

2. The cycloolefin polymer bonding method according to claim 1, wherein
   the bonding surface of the first material and the bonding surface of the second material both have surface roughness Ra that is 10 nm or less.

3. The cycloolefin polymer bonding method according to claim 1, wherein
   a pressure of plasma in the $H_2O$-plasma exposure step is 1 to 200 Pa.

4. The cycloolefin polymer bonding method according to claim 1, wherein
   a time period during which the bonding surface of the first material is exposed to $H_2O$-plasma in the $H_2O$-plasma exposure step is 2 to 600 seconds.

5. The cycloolefin polymer bonding method according to claim 1, wherein
   a partial pressure of $H_2O$ in the $H_2O$-plasma is 20% or more.

6. The cycloolefin polymer bonding method according to claim 1, wherein
   power of high-frequency electrical power for generating the $H_2O$-plasma is 10 to 400 W.

7. The cycloolefin polymer bonding method according to claim 1, wherein
   the second material is a cycloolefin polymer or glass.

8. A method of manufacturing a cycloolefin-polymer microchannel chip comprising:
   a first $H_2O$-plasma exposure step of exposing, to $H_2O$-plasma, at least one of a top surface of a lower substrate made of cycloolefin polymer and a bottom surface of a middle substrate made of cycloolefin-polymer, the middle substrate being formed with a passage;
   a first overlapping step of overlapping the top surface of the lower substrate and the bottom surface of the middle substrate in a vertical direction;
   bonding the overlapped top surface of the lower substrate and the overlapped bottom surface of the middle substrate by own weight of the lower substrate or the middle substrate with no heat or pressure applied;
   a second $H_2O$-plasma exposure step of exposing, to the $H_2O$-plasma, at least one of a top surface of the middle substrate and a bottom surface of an upper substrate made of cycloolefin polymer;
   a second overlapping step of overlapping the top surface of the middle substrate and the bottom surface of the upper substrate in a vertical direction; and
   bonding the overlapped top surface of the middle substrate and the overlapped bottom surface of the upper substrate by own weight of the middle substrate or the upper substrate with no heat or pressure applied.

* * * * *